United States Patent
Li et al.

(10) Patent No.: US 12,013,478 B2
(45) Date of Patent: Jun. 18, 2024

(54) TIMING FOR LISTEN BEFORE TALK FOR RADAR

(71) Applicant: QUALCOMM Incorporated, San Diego, CA (US)

(72) Inventors: Junyi Li, Chester, NJ (US); Dan Zhang, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 16/949,340

(22) Filed: Oct. 26, 2020

(65) Prior Publication Data

US 2022/0128648 A1   Apr. 28, 2022

(51) Int. Cl.
*G01S 7/00* (2006.01)
*G01S 7/35* (2006.01)

(52) U.S. Cl.
CPC ............. *G01S 7/006* (2013.01); *G01S 7/352* (2013.01); *G01S 7/356* (2021.05)

(58) Field of Classification Search
CPC ............ H04W 16/14; H04W 74/0808; H04W 52/367; H04W 84/12; H04W 72/0473; H04W 72/082; H04W 72/0446; H04W 72/0453; H04W 72/23; H04W 74/0816; H04W 52/38; H04B 17/345; H04B 1/1027; H04B 1/10; H04B 17/309; H04B 17/336; H04B 17/102; H04B 7/0617; H04B 2001/7152; H04B 1/715; G01S 7/023; G01S 7/021; G01S 13/9023; G01S 13/343; G01S 13/931; G01S 7/356; G01S 7/354; G01S 13/34; G01S 13/345; G01S 13/42; G01S 13/584; G01S 7/006; G01S 7/352
See application file for complete search history.

(56) References Cited

U.S. PATENT DOCUMENTS

| | | | | |
|---|---|---|---|---|
| 5,280,288 | A * | 1/1994 | Sherry | ............ G01S 13/38 342/159 |
| 11,324,051 | B2 * | 5/2022 | Ahn | ............ H04W 74/08 |
| 11,520,003 | B2 * | 12/2022 | Stettiner | ............ H04B 1/715 |
| 2006/0181448 | A1 * | 8/2006 | Natsume | ............ G01S 7/36 342/111 |
| 2007/0188373 | A1 | 8/2007 | Shirakawa et al. | |
| 2018/0352577 | A1 * | 12/2018 | Zhang | ............ H04W 74/0816 |

(Continued)

FOREIGN PATENT DOCUMENTS

EP          1983353 A1     10/2008
WO   WO-2017068396 A1 *  4/2017  ............ G01S 7/021

OTHER PUBLICATIONS

International Search Report and Written Opinion—PCT/US2021/071516—ISA/EPO—dated Dec. 23, 2021.

*Primary Examiner* — Olumide Ajibade Akonai
(74) *Attorney, Agent, or Firm* — Harrity & Harrity, LLP

(57) ABSTRACT

Various aspects of the present disclosure generally relate to wireless communication. In some aspects, a radar device may process a transmitted radar signal and a received radar signal to obtain at least one energy level measurement. The radar device may determine that the at least one energy level measurement satisfies a threshold value. The radar device may perform a listen before talk procedure based at least in part on determining that the at least one energy level measurement satisfies the threshold value. Numerous other aspects are provided.

30 Claims, 7 Drawing Sheets

(56) References Cited

U.S. PATENT DOCUMENTS

| | | | |
|---|---|---|---|
| 2020/0088838 A1* | 3/2020 | Melzer | G01S 7/023 |
| 2020/0191911 A1* | 6/2020 | Meissner | G01S 7/352 |
| 2020/0314906 A1* | 10/2020 | Goyal | H04W 74/0816 |
| 2020/0336987 A1* | 10/2020 | Mukherjee | H04W 74/0808 |
| 2021/0025997 A1* | 1/2021 | Rosenzweig | G01S 7/4868 |
| 2021/0349179 A1* | 11/2021 | Sakhnini | G01S 13/931 |
| 2022/0022254 A1* | 1/2022 | Gulati | H04W 74/0808 |
| 2022/0075021 A1* | 3/2022 | Åström | G01S 7/023 |

\* cited by examiner

TIMING FOR LISTEN BEFORE TALK FOR RADAR

FIELD OF THE DISCLOSURE

Aspects of the present disclosure generally relate to wireless communication and to techniques and apparatuses for timing for listen before talk (LBT) for radar.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a radar device includes processing a transmitted radar signal and a received radar signal to obtain at least one energy level measurement; determining that the at least one energy level measurement satisfies a threshold value; and performing a listen before talk procedure based at least in part on determining that the at least one energy level measurement satisfies the threshold value.

In some aspects, a radar device for wireless communication includes a memory and one or more processors operatively coupled to the memory, the memory and the one or more processors configured to: process a transmitted radar signal and a received radar signal to obtain at least one energy level measurement; determine that the at least one energy level measurement satisfies a threshold value; and perform a listen before talk procedure based at least in part on determining that the at least one energy level measurement satisfies the threshold value.

In some aspects, a non-transitory computer-readable medium storing a set of instructions for wireless communication includes one or more instructions that, when executed by one or more processors of a radar device, cause the radar device to: process a transmitted radar signal and a received radar signal to obtain at least one energy level measurement; determine that the at least one energy level measurement satisfies a threshold value; and perform a listen before talk procedure based at least in part on determining that the at least one energy level measurement satisfies the threshold value.

In some aspects, an apparatus for wireless communication includes means for processing a transmitted radar signal and a received radar signal to obtain at least one energy level measurement; means for determining that the at least one energy level measurement satisfies a threshold value; and means for performing a listen before talk procedure based at least in part on determining that the at least one energy level measurement satisfies the threshold value.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
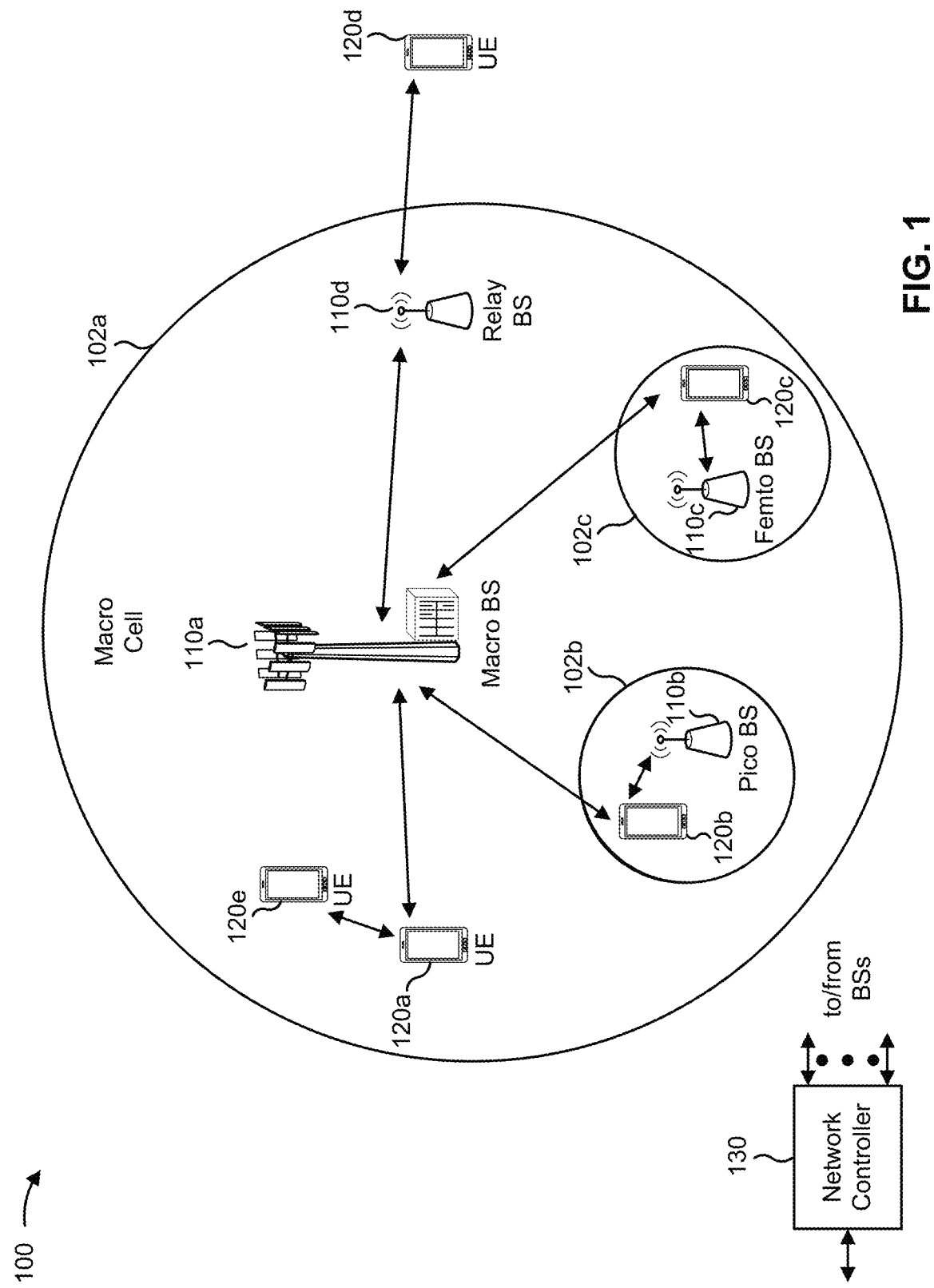
- FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
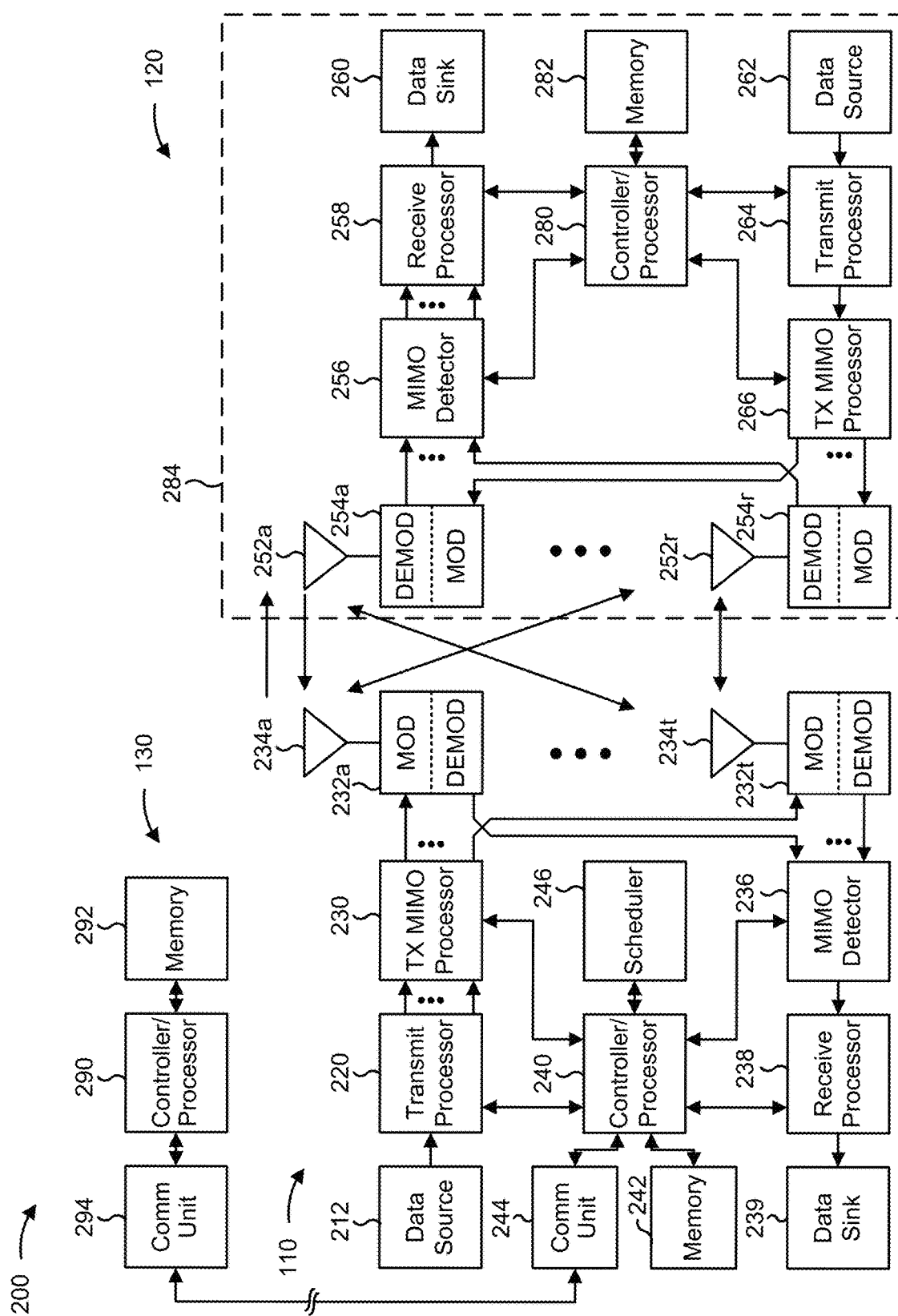
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-6.

Controller/processor 240 of base station 110, controller/processor 280 of UE 120, and/or any other component(s) of FIG. 2 may perform one or more techniques associated with timing for listen before talk (LBT) for radar, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, interpreting the instructions, and/or the like.

In some aspects, a radar device (which may be, include, or be included in a base station 110, a UE 120, and/or the like) includes means for processing a transmitted radar signal and a received radar signal to obtain at least one energy level measurement; means for determining that the at least one energy level measurement satisfies a threshold value; and/or means for performing an LBT procedure based at least in part on determining that the at least one energy level measurement satisfies the threshold value. The means for the radar device to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246; and/or antenna 252, demodulator 254, MIMO detector 256, receive processor 258, transmit processor 264, TX MIMO processor 266, modulator 254, controller/processor 280, and/or memory 282.

In some aspects, the radar device includes means for mixing the transmitted radar signal and the received radar signal to obtain a mixed signal; and/or means for performing a spectral analysis of the mixed signal.

In some aspects, the radar device includes means for performing a range fast Fourier transform of the mixed signal to obtain a range spectrum, In some aspects, the radar device includes means for determining a set of transmission parameters for transmitting a radar signal based at least in part on performing the LBT procedure.

In some aspects, the radar device includes means for transmitting the radar signal based at least in part on the set of transmission parameters.

In some aspects, the radar device includes means for performing an initial LBT procedure; and/or means for determining the initial set of transmission parameters for the transmitted radar signal based at least in part on the initial LBT procedure.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
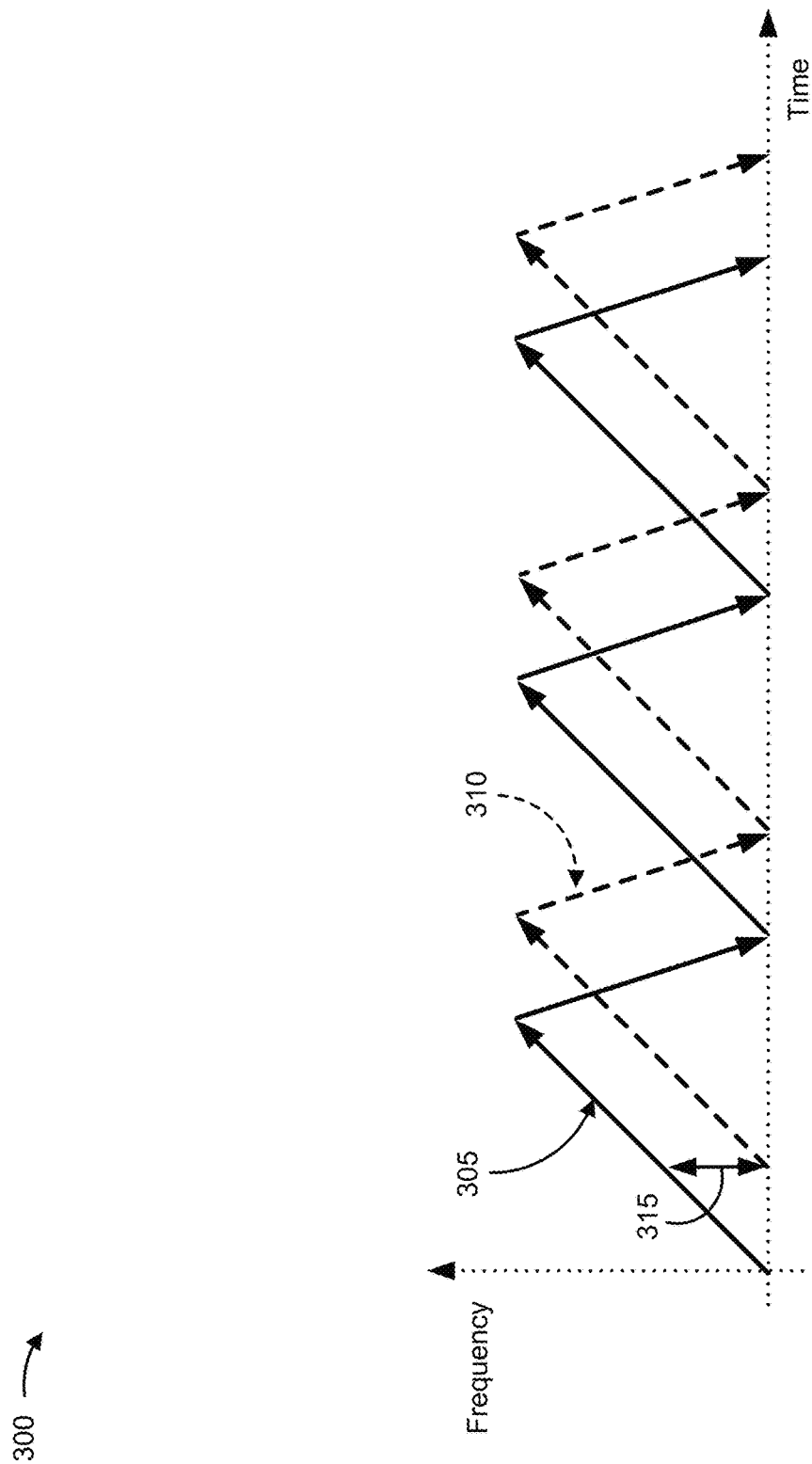
FIGS. 3-4 are diagrams illustrating examples associated with radar detection, in accordance with various aspects of the present disclosure.

FIG. 3 is a diagram illustrating an example 300 associated with radar detection, in accordance with various aspects of the present disclosure. For example, the radar detection may be frequency modulated continuous wave (FMCW) radar detection. Example 300 illustrates repetitions of an FMCW chirp 305 (as shown by the solid arrows above the "time" axis) in terms of frequency over time and of a received signal 310 (as shown by the dashed arrows above the "time" axis).

In some aspects, for example, a single instance (e.g., cycle) of the FMCW chirp 305 may be represented by a pair of arrows—a rising arrow representing an increase from a first frequency value to a second frequency value (e.g., a frequency sweep), and an immediately subsequent falling arrow, indicating a decrease from the second frequency value to the first frequency value. Similarly, a single instance of the received signal 310 may be represented by a pair of arrows—a rising arrow representing an increase from a first frequency value to a second frequency value and an immediately subsequent falling arrow, indicating a decrease from the second frequency value to the first frequency value.

FMCW radar uses a linear frequency modulated signal to obtain range. The received signal is mixed with the transmitted signal to obtain the beat frequency 315 between the two. The beat frequency may be a difference between an instantaneous frequency of the FMCW chirp 305 and a corresponding instantaneous frequency of the received signal 310. The beat frequency may be a function of the round-trip time to the reflecting target, and therefore can be mapped directly to the target's range. Beamforming associated with multiple receiver channels may be used to determine direction of arrival (DoA) of a received signal, which may correlate to a target's azimuthal location. Multiple radar signal chirps may be transmitted in a train of equally spaced pulses in time. Radial motion occurring between pulses within a range of resolution cell induces a shift over the pulses, which may be used to compute the Doppler radial velocity in that cell. Received radar data may be expressed as a three-dimensional (3D) tensor, with the first two dimensions (range and DoA) making up polar space, and the third dimension (Doppler radial velocity) containing velocity information.

As indicated above, FIG. 3 is provided merely as one or more examples. Other examples may differ from what is described with regard to FIG. 3.

Figure 4:
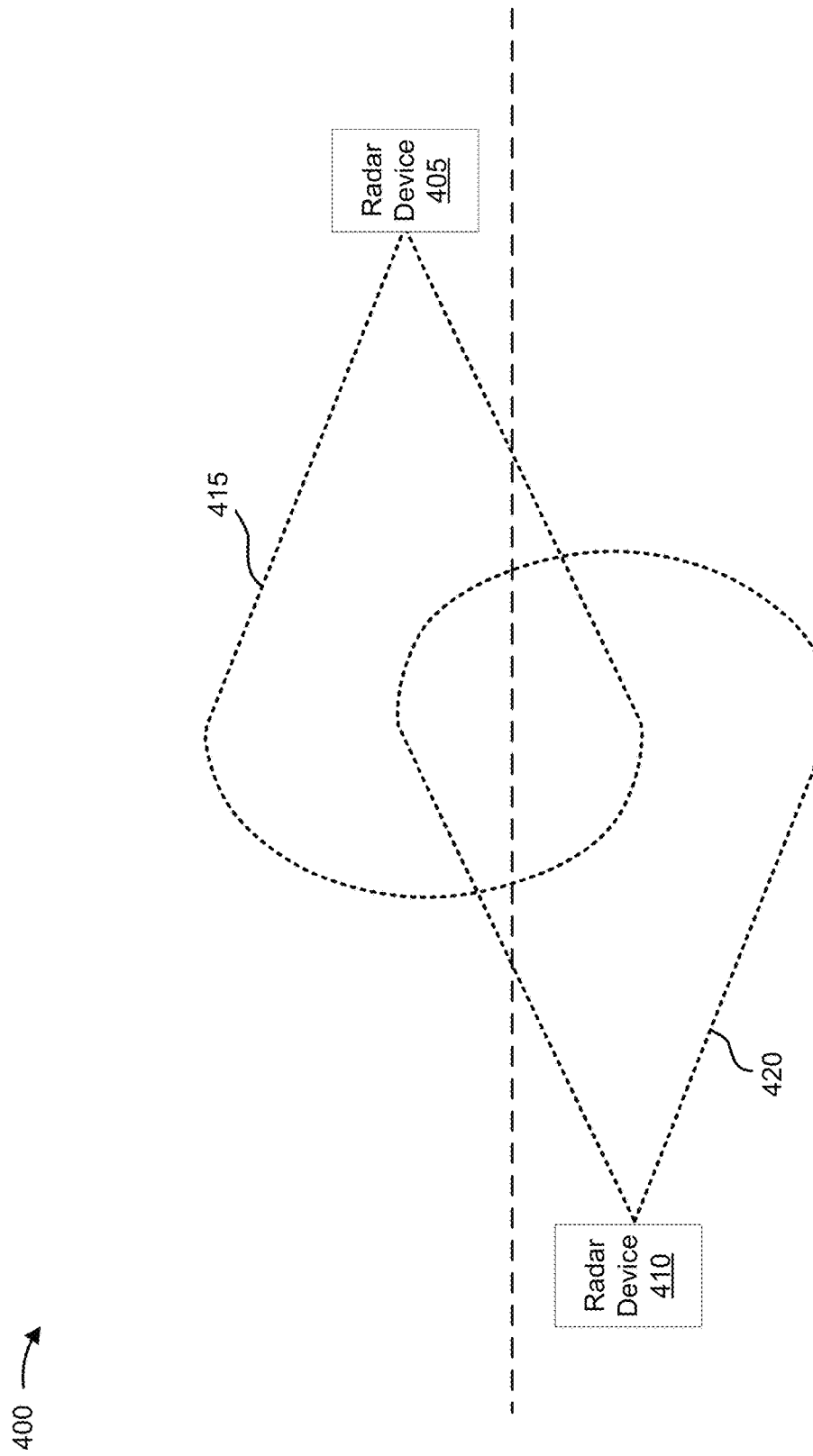

FIG. 4 is a diagram illustrating an example associated with radar detection, in accordance with various aspects of the present disclosure. For example, the radar detection may be FMCW radar detection. As shown, a first radar device 405 and a second radar device 410 may transmit signals 415 and 420, respectively.

In some cases, the radar device 405 may transmit the signal 415 in a full duplex mode (e.g., data or radar signals may be transmitted and received simultaneously at the radar device 405 or the radar device 410). As an illustrative example, the signals 415 and 420 may be examples of FMCW radar signals. In many instances, particularly when other nearby FMCW radar devices are being used, distinguishing between interference and real targets may be difficult. In some cases, this difficulty is due to the fact that a beat frequency, calculated based at least in part on a difference between instantaneous frequencies of the transmitted FMCW signal and a received interference signal, may be indistinguishable from a beat frequency associated with a reflective target. This may be particularly true where the interference signal is a transmitted FMCW chirp from another nearby radar device. For instance, the radar device 405 may be moving towards the radar device 410. The radar device 410 may be transmitting the signal 420 (e.g., a FMCW radar signal) at a same time or on same resources that the radar device 405 is transmitting the signal 415. Moreover, current radar systems do not perform sensing of the air medium before transmission in order to detect potential interference. As a result, a radar device may trigger unnecessary actions based on false detection of a target, fail to trigger actions that should be triggered in the presence of a target based on a failure to detect a target due to the presence of interference, transmit additional radar chirps in an attempt to distinguish a target, thereby increasing processing and communication resource consumption, and/or the like.

Some implementations utilize an LBT procedure to determine whether radio frequency resources are occupied or unoccupied, which may enable a radar device to avoid interference (e.g., the radar device may refrain from transmitting or proceed to transmit a radar signal based on a result of the one or more LBT procedures indicating whether a set of resources are clear for transmission). In such LBT procedures, the radar device may perform LBT operations based on a generated waveform for a signal (e.g., a radar signal), which may result in more accurate interference measurements for signaling over a set of resources.

In particular, the radar device 405 may identify a set of transmission parameters for a transmit waveform of the signal 415. In some examples, the transmission parameters may be chirp parameters for a cycle of an FMCW radar signal. Examples of transmission parameters are described below in connection with FIG. 5. The radar device 405 may utilize the set of transmission parameters to determine (e.g., generate) a first waveform for the signal 415. For example, the radar device 405 may generate an analog transmit waveform but may refrain from transmitting a signal for a time period (e.g., zero power may be implemented with the transmit waveform until completion of an LBT period).

The radar device 405 may perform the LBT procedure using the generated waveform. For example, the radar device 405 may perform channel sensing on a set of resources (e.g., resources that the radar device 405 intends to utilize to transmit the generated waveform), in order to determine if the resources are occupied by the radar device 410. The radar device 405 may adjust a detected signal (e.g., a received energy from a channel sensing procedure) based on the generated waveform. Adjusting the detected signal may include mixing the generated waveform with a received energy associated with the detected signal. Additionally, or alternatively, adjusting the detected signal may include processing an output (e.g., a mixer output) of the mixture of the waveform and the detected signal. Such processing may include filtering and a fast-Fourier transform (FFT) of the output, which may yield a measurement (e.g., a value such as a peak of a spectrum of the mixture of the waveform and the detected signal). In some examples, the measurement may indicate an interference (e.g., a mutual interference) that may occur between the signal 415 with the generated waveform and the signal 420 from the radar device 410.

In some examples, the radar device 405 may compare the measurement to a threshold. For example, the radar device 405 may compare a threshold value to a peak value of a spectrum obtained from processing the mixer output of the generated waveform and the received energy on the set of resources. The radar device 405 may determine whether the threshold is satisfied based on the comparison. For example, the radar device 405 may determine that the LBT procedure was successful (e.g., a result of the comparison of the LBT procedure indicates that transmitting the signal 415 with the generated waveform in accordance with the set of transmit parameters, would result in a relatively low amount of interference with the signal 420).

Additionally or alternatively, the radar device 405 may compare the measurement to the threshold and determine that the measurement fails to satisfy the threshold (e.g., a failed result of the LBT procedure may indicate that transmitting the signal 415 with the generated waveform in accordance with the set of transmit parameters would result in a relatively high amount of interference with the signal 420). In such examples, the radar device 405 may perform another LBT procedure with a second set of transmission parameters. If the LBT procedure using the second set of transmission parameters (e.g., mixing a second waveform, different from the previously generated waveform, with a detected signal) is successful, the radar device 405 may transmit the signal in accordance with the second set of transmission parameters. If the LBT procedure using the second set of transmission parameters is not successful, in some examples, the radar device 405 may select a third set of transmission parameters and attempt LBT access again (and so on, until a successful result is achieved).

In some examples, the radar device 405 may determine that an LBT failure has occurred. For example, the radar device 405 may be configured with a threshold quantity of LBT procedures to attempt (e.g., the radar device 405 may only attempt five LBT procedures with five different sets of parameters, or any other quantity of attempts). Additionally, or alternatively, the radar device 405 may have attempted LBT procedures for all possible sets of transmission parameters and failed to obtain a successful result for each set of transmission parameters (e.g., each waveform generated for each attempt may result in an interference measurement higher than a threshold). The radar device 405 may select a set of transmission parameters that results in the smallest interference measurement (e.g., the set of transmission parameters of one or more LBT procedures that resulted in a smallest peak interference with the signal 420). The radar device 405 may transmit a waveform corresponding to the selected set of transmission parameters.

In some cases, channel conditions may change over time, for example, due to movement of a radar device and/or due to other radar devices moving into an area of the radar device, among other examples. Thus, the set of transmission parameters selected by the radar device may become unsuitable due to increased interference. However, the radar device may not be enabled to determine when a set of transmission parameters becomes unsuitable due to interference and/or determine when to perform a new LBT procedure to select a new set of transmission parameters.

According to various techniques and apparatuses described herein, a radar device may determine a timing for performing an LBT procedure. In some aspects, the radar device may process transmitted and received signals to obtain a range spectrum, and may determine (e.g., in real time) to perform an LBT procedure when an energy level measurement associated with a range spectrum satisfies a threshold value. In this way, the radar device may identify received signals that are likely to be interference (and not a reflection of a transmitted signal) and perform an LBT procedure to determine a new set of transmission parameters that are likely to experience less interference. As a result, the radar device may detect targets with greater accuracy, reduce false detections of targets, and/or the like.

As indicated above, FIG. 4 is provided as an example. Other examples may differ from what is described with regard to FIG. 4.

Figure 5:
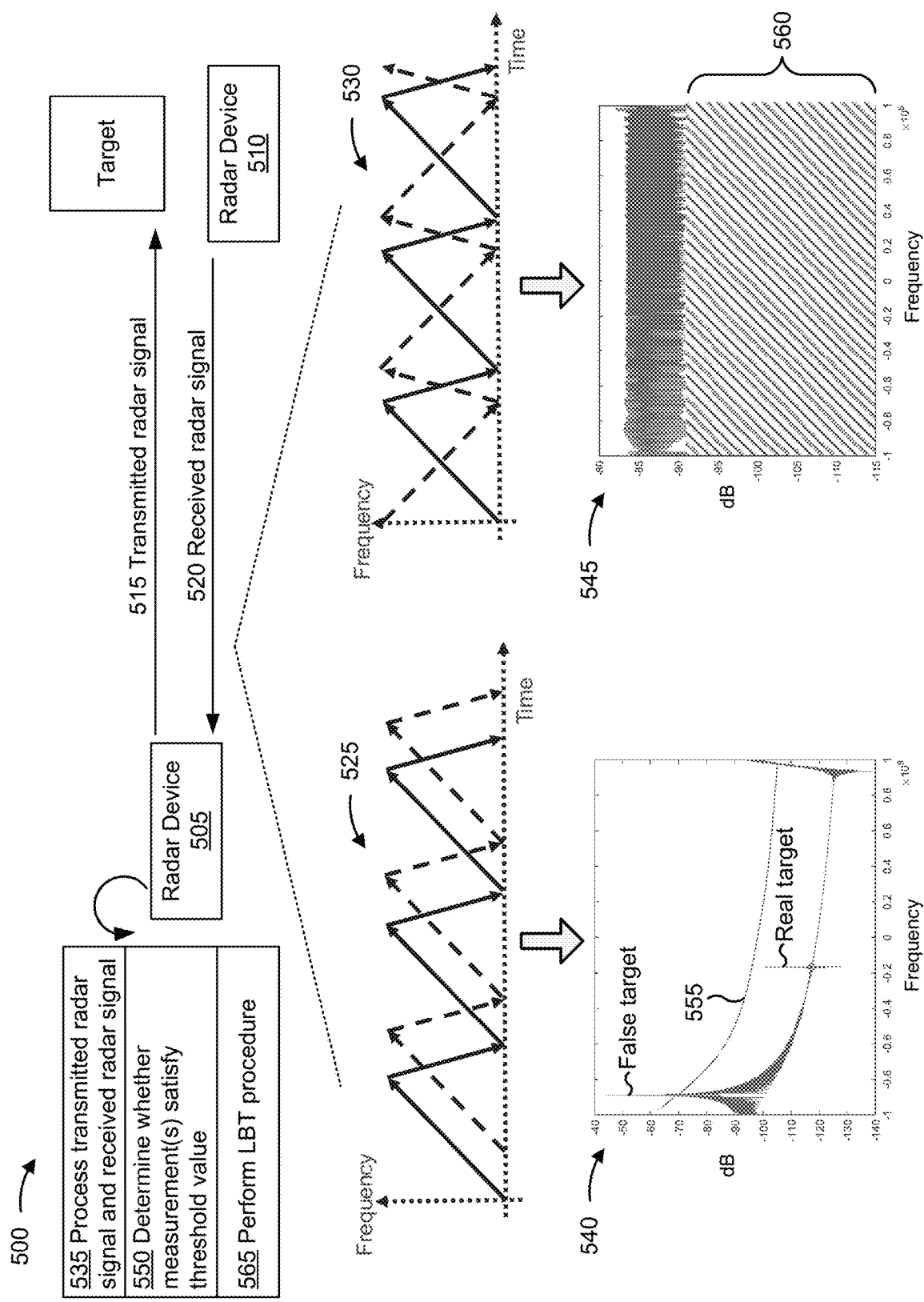
FIG. 5 is a diagram illustrating an example associated with timing for listen before talk (LBT) for radar, in accordance with various aspects of the present disclosure.

FIG. 5 is a diagram illustrating an example 500 associated with timing for LBT for radar, in accordance with various aspects of the present disclosure. As shown in FIG. 5, example 500 includes a radar device 505, a radar device 510, and one or more targets (e.g., targets for radar detection, such as vehicles, pedestrians, or other objects). The radar device 505 and/or the radar device 510 may correspond to or include the radar device 405 or the radar device 410. In some aspects, the radar device 505 and/or the radar device 510 may be an FMCW radar device. That is, the radar device 505 and/or the radar device 510 may transmit FMCW radar signals. In some aspects, the radar device 505 and/or the radar device 510 may be, be similar to, include, or be included in a base station (such as the base station 110 shown in, and described in connection with, FIGS. 1 and/or 2), a UE (such as the UE 120 shown in, and described in connection with, FIGS. 1 and/or 2), and/or the like. In some aspects, the radar device 505 and/or the radar device 510 (and/or UEs associated therewith) may be implemented in one or more vehicles. The one or more vehicles may include any vehicle that includes a radar device as described herein. For example, a vehicle may be a consumer vehicle, an industrial vehicle, a commercial vehicle, and/or the like. A vehicle may be capable of traveling and/or providing transportation via public roadways, may be capable of use in operations associated with a worksite (e.g., a construction site), and/or the like. A vehicle may be controlled autonomously and/or semi-autonomously. Additionally, or alternatively, a vehicle may be controlled by an operator.

As shown by reference number 515, the radar device 505 may transmit a radar signal. For example, the radar device 505 may transmit an FMCW radar signal. In this example, the radar device 505 may transmit a series (e.g., a train) of chirps, where a chirp may refer to a cycle of an FMCW radar signal.

The radar device 505 may transmit the radar signal according to a set of transmission parameters. For example, for an FMCW radar signal, the set of transmission parameters may include a carrier frequency, a bandwidth sweep range (e.g., the signal may be transmitted across a 1 GHz range, a 1.5 GHz range, and/or the like), a sweeping time (e.g., the radar device may complete a bandwidth sweep of the signal in 2 microseconds, 6 microseconds, 12 microseconds, and/or the like), a direction of a sweep (e.g., a chirp of the signal may be directed from a 77 degree angle from the radar device to a 78 degree angle from the radar device, or from the 78 degree angle to the 77 degree angle, although any parameter indicating a direction of the sweep may be used), a direction of a chirp (e.g., a chirp may include an up-sweep followed by a down-sweep, or include a down-sweep followed by an up-sweep), and/or the like. In some aspects, the radar device 505 may determine the transmission parameters for the transmitted signal using an LBT procedure (e.g., at a turn-on of the radar device 505), such as the LBT procedure described above in connection with FIG. 4.

As shown by reference number 520, the radar device 505 may receive a radar signal. For example, the radar device 505 may listen for a reflection of the transmitted radar signal. However, in addition to or instead of the reflection of the transmitted radar signal, the received radar signal may be transmitted by another nearby radar device 510. The received radar signal may be an FMCW radar signal. Thus, the received radar signal may interfere with detection operations of the radar device 505.

As shown by reference number 525, in some aspects, the transmitted radar signal (shown as chirps in solid line) and the received radar signal (shown as chirps in dashed line) may sweep in the same direction. As shown by reference number 530, in some aspects, the transmitted radar signal and the received radar signal may sweep in opposite directions.

As shown by reference number 535, the radar device 505 may process the transmitted radar signal and the received radar signal. For example, where the signals are FMCW signals, the radar device 505 may process the transmitted radar signal and the received radar signal per cycle/chirp. In some aspects, the radar device 505 may mix (e.g., multiply) the transmitted signal (e.g., a single cycle of the transmitted signal) and the received signal (e.g., a single cycle of the received signal) to obtain a mixed signal (e.g., a mixer output). The radar device 505 may further process the mixed signal by filtering and/or performing a spectral analysis. The spectral analysis may include performing an FFT of the mixed signal (e.g., per cycle/chirp) to yield a range spectrum, as shown by reference numbers 540 and 545. The radar device 505 may obtain one or more measurements, such as energy level measurements, from the range spectrum.

In some aspects, the energy level measurements may be associated with a beat frequency for the transmitted radar signal and the received radar signal. As shown by reference number 540, a beat frequency may be represented by a spike on a range spectrum when the received radar signal is sweeping frequency in the same direction as the transmitted radar signal. For example, a beat frequency for the transmitted radar signal and the received radar signal (e.g., for a false target) may be represented by a spike on the range spectrum and a beat frequency for the transmitted radar signal and a reflection of the transmitted radar signal (e.g., for a real target) may be represented by another spike on the range spectrum. As shown, the interference may produce a stronger signal than a real target. Accordingly, in some aspects, the energy level measurement may be a peak energy level measurement associated with one or more spikes of the range spectrum.

As shown by reference number 545, a beat frequency may be represented by wideband noise on a range spectrum when the received radar signal is sweeping frequency in the opposite direction as the transmitted radar signal. For example, a beat frequency for the transmitted radar signal and the received radar signal (e.g., for a false target) may be represented by wideband noise, which may have an elevated noise floor relative to background thermal noise. Accordingly, in some aspects, the energy level measurement may be a total energy level measurement.

As shown by reference number 550, the radar device 505 may determine whether the one or more measurements satisfy a threshold value. For example, the radar device 505 may determine whether a peak energy level measurement, associated with a spike of the range spectrum, satisfies (e.g., is more than) a threshold value 555 (e.g., a range-dependent threshold value). Additionally, or alternatively, the radar device 505 may determine whether a total energy level measurement satisfies a threshold value 560. In this way, the radar device 505 may determine that the received radar signal is associated with interference, rather than a reflection of the transmitted radar signal, when a peak energy level measurement and/or a total energy level measurement satisfies a respective threshold value.

In some aspects, a threshold value may be configured, or otherwise provisioned, for the radar device 505. In some aspects, the radar device 505 may determine a threshold value. For example, the radar device 505 may determine a threshold value based at least in part on previous measurements, a pattern of previous measurements, and/or the like. As an example, the radar device 505 may determine a threshold value based at least in part on an output of a machine learning model, an algorithm, or the like. In such cases, the radar device 505 may dynamically determine a threshold value that is to be used for each spectral analysis performed by the radar device 505.

As described above, the measurements may be associated with a range spectrum, which is determined by the radar device 505 on a per cycle/chirp basis. Thus, for each cycle/chirp of the transmitted radar signal and the received radar signal, the radar device 505 may obtain measurements and determine whether the measurements satisfy a threshold value, as described above. In this way, the radar device 505 may identify likely interference in real time and as part of normal radar processing operations performed by the radar device 505.

As shown by reference number 565, the radar device 505 may perform an LBT procedure. For example, the radar device 505 may perform the LBT procedure based at least in part on a determination of likely interference from another radar device. That is, the radar device 505 may perform the LBT procedure based at least in part on determining that a peak energy level measurement and/or a total energy level measurement (e.g., for a cycle/chirp) satisfies a respective threshold value. In some aspects, the LBT procedure may be the LBT procedure described above in connection with FIG. 4.

In some aspects, the radar device 505 may determine a new set of transmission parameters based at least in part on performing the LBT procedure. The new set of transmission parameters may be different (e.g., differ by at least one parameter) from the set of transmission parameters previously used by the radar device (e.g., for transmitting the radar signal described in connection with reference number 515). For example, the radar device 505 may refrain from using the previous set of transmission parameters when performing the LBT procedure.

The radar device 505 may transmit a radar signal using the new set of transmission parameters. The new set of transmission parameters may result in reduced interference. In this way, the radar device 505 may detect targets with greater accuracy, reduce false detections of targets, and/or the like.

As indicated above, FIG. 5 is provided as an example. Other examples may differ from what is described with respect to FIG. 5.

Figure 6:
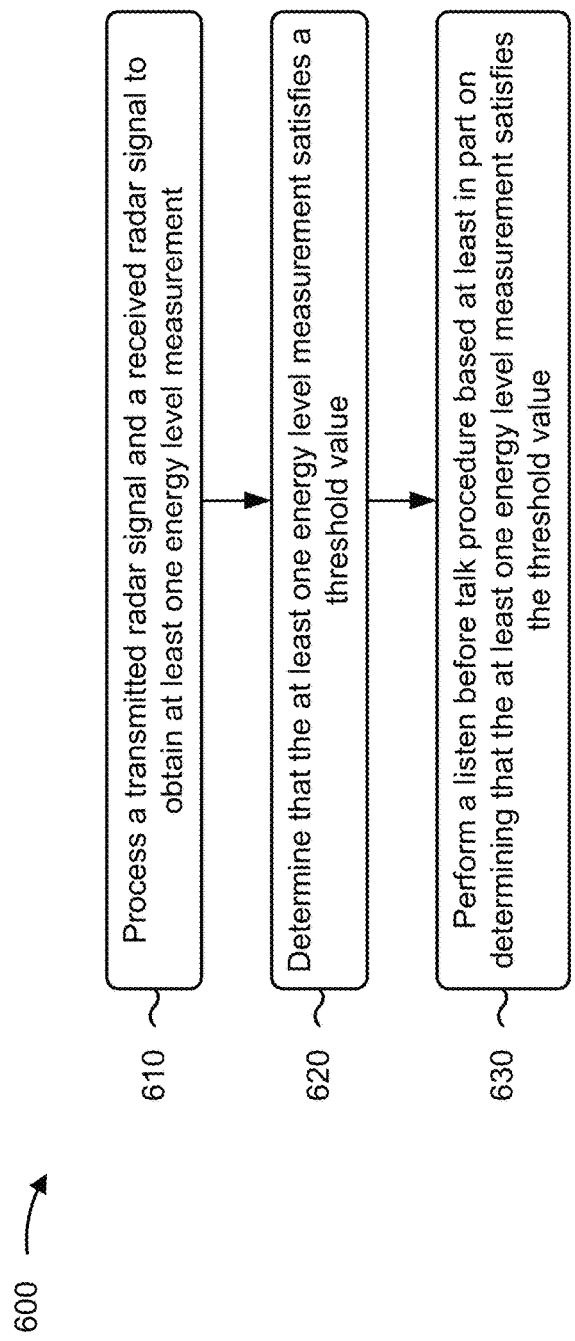
FIG. 6 is a diagram illustrating an example process associated with timing for LBT for radar, in accordance with various aspects of the present disclosure.

FIG. 6 is a diagram illustrating an example process 600 performed, for example, by a radar device, in accordance with various aspects of the present disclosure. Example process 600 is an example where the radar device (e.g., radar device 505) performs operations associated with timing for LBT for radar.

As shown in FIG. 6, in some aspects, process 600 may include processing a transmitted radar signal and a received radar signal to obtain at least one energy level measurement (block 610). For example, the radar device (e.g., using radar processing component 708, depicted in FIG. 7) may process a transmitted radar signal and a received radar signal to obtain at least one energy level measurement, as described above.

As further shown in FIG. 6, in some aspects, process 600 may include determining that the at least one energy level measurement satisfies a threshold value (block 620). For example, the radar device (e.g., using determination component 710, depicted in FIG. 7) may determine that the at least one energy level measurement satisfies a threshold value, as described above.

As further shown in FIG. 6, in some aspects, process 600 may include performing an LBT procedure based at least in part on determining that the at least one energy level measurement satisfies the threshold value (block 630). For example, the radar device (e.g., using LBT component 712, depicted in FIG. 7) may perform an LBT procedure based at least in part on determining that the at least one energy level measurement satisfies the threshold value, as described above.

Process 600 may include additional aspects, such as any single aspect or any combination of aspects described below and/or in connection with one or more other processes described elsewhere herein.

In a first aspect, the transmitted radar signal and the received radar signal are FMCW radar signals.

In a second aspect, alone or in combination with the first aspect, a single cycle of the FMCW radar signals is processed to obtain the at least one energy level measurement.

In a third aspect, alone or in combination with one or more of the first and second aspects, the at least one energy level measurement is at least one of a peak energy level measurement or a total energy level measurement.

In a fourth aspect, alone or in combination with one or more of the first through third aspects, processing the transmitted radar signal and the received radar signal includes mixing the transmitted radar signal and the received radar signal to obtain a mixed signal, and performing a spectral analysis of the mixed signal.

In a fifth aspect, alone or in combination with one or more of the first through fourth aspects, performing the spectral analysis includes performing a range FFT of the mixed signal to obtain a range spectrum, and the at least one energy level measurement is obtained from the range spectrum.

In a sixth aspect, alone or in combination with one or more of the first through fifth aspects, process 600 includes determining a set of transmission parameters for transmitting a radar signal based at least in part on performing the LBT procedure.

In a seventh aspect, alone or in combination with one or more of the first through sixth aspects, process 600 includes transmitting the radar signal based at least in part on the set of transmission parameters.

In an eighth aspect, alone or in combination with one or more of the first through seventh aspects, the set of transmission parameters is different from an initial set of transmission parameters for the transmitted radar signal.

In a ninth aspect, alone or in combination with one or more of the first through eighth aspects, process 600 includes performing an initial LBT procedure, and determining the initial set of transmission parameters for the transmitted radar signal based at least in part on the initial LBT procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
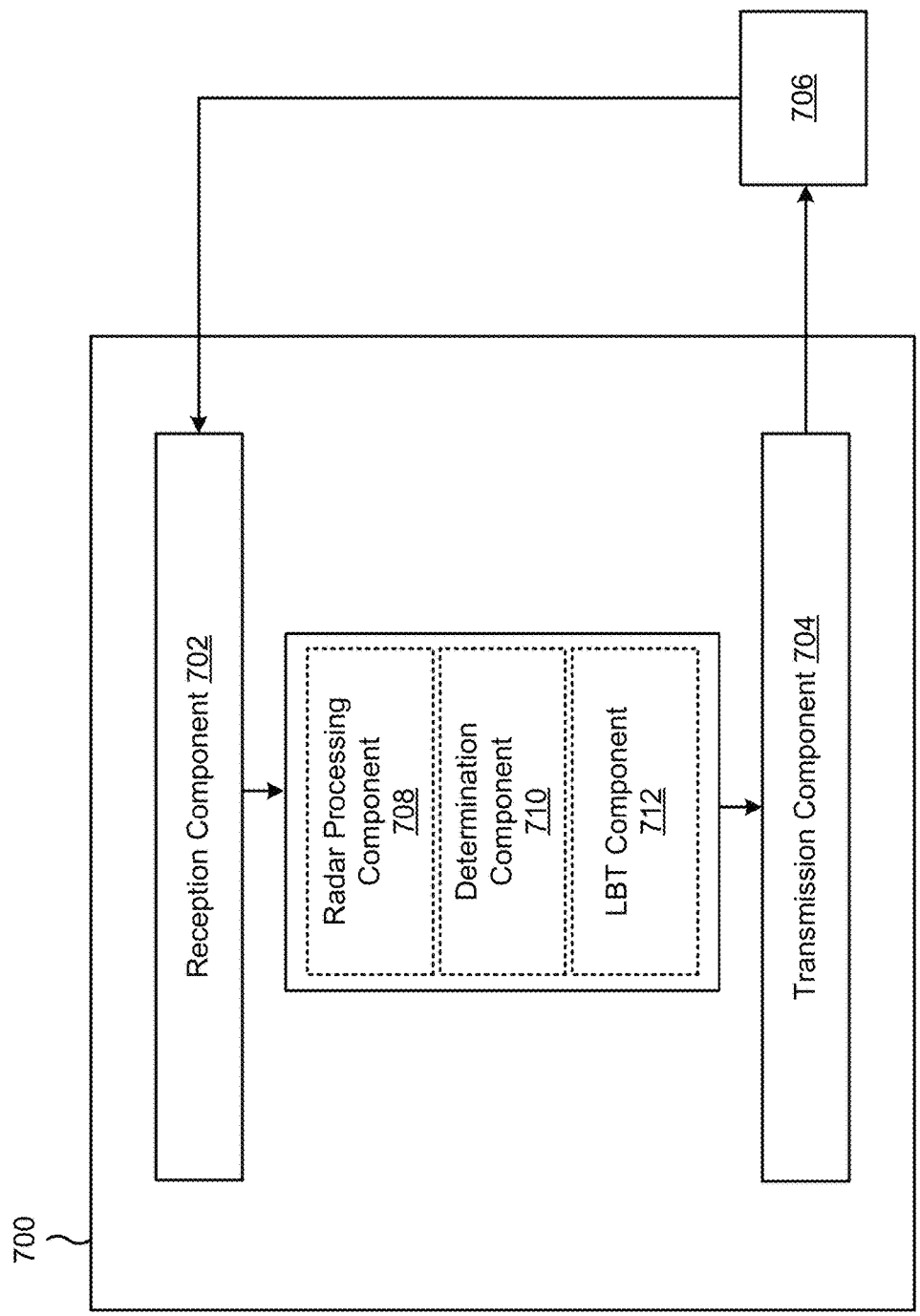
FIG. 7 is a diagram of an example apparatus for wireless communication, in accordance with various aspects of the present disclosure.

FIG. 7 is a diagram of an example apparatus 700 for wireless communication. The apparatus 700 may be a radar device, or a radar device may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a radar processing component 708, a determination component 710, or an LBT component 712, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the radar device described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may receive a radar signal. In some aspects, the reception component 702 may include one or more antennas, a demodulator, a MIMO detector, a receive processor, a controller/processor, a memory, or a combination thereof, of the radar device described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may transmit a radar signal. In some aspects, the transmission component 704 may include one or more antennas, a modulator, a transmit MIMO processor, a transmit processor, a controller/processor, a memory, or a combination thereof, of the radar device described above in connection with FIG. 2. In some aspects, the transmission component 704 may be collocated with the reception component 702 in a transceiver.

The radar processing component 708 may process a transmitted radar signal and a received radar signal to obtain at least one energy level measurement. In some aspects, the radar processing component 708 may include a controller/processor, a memory, or a combination thereof, of the radar device described above in connection with FIG. 2. In some aspects, the radar processing component 708 may mix the transmitted radar signal and the received radar signal to obtain a mixed signal. In some aspects, the radar processing component 708 may perform a spectral analysis of the mixed signal. In some aspects, the radar processing component 708 may perform a range FFT of the mixed signal to obtain a range spectrum. In some aspects, the radar processing component 708 may obtain the at least one energy level measurement from the range spectrum.

The determination component 710 may determine that the at least one energy level measurement satisfies a threshold value. In some aspects, the determination component 710 may include a controller/processor, a memory, or a combination thereof, of the radar device described above in connection with FIG. 2. The LBT component 712 may perform an LBT procedure based at least in part on determining that the at least one energy level measurement satisfies the threshold value. In some aspects, the LBT component 712 may include a controller/processor, a memory, or a combination thereof, of the radar device described above in connection with FIG. 2.

The determination component 710 may determine a set of transmission parameters for transmitting a radar signal based at least in part on performing the LBT procedure. The transmission component 704 may transmit the radar signal based at least in part on the set of transmission parameters.

The LBT component 712 may perform an initial LBT procedure. The determination component 710 may determine the initial set of transmission parameters for the transmitted radar signal based at least in part on the initial LBT procedure.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a radar device, comprising:
    processing a transmitted radar signal and a received radar signal to obtain at least one energy level measurement;
    determining that the at least one energy level measurement satisfies a threshold value associated with a previous measurement of a previously transmitted radar signal, wherein the at least one energy level measurement comprises a total energy level measurement; and
    performing a listen before talk procedure based at least in part on determining that the at least one energy level measurement satisfies the threshold value.

2. The method of claim 1, wherein the transmitted radar signal and the received radar signal are frequency modulated continuous wave (FMCW) radar signals.

3. The method of claim 2, wherein a single cycle of the FMCW radar signals is processed to obtain the at least one energy level measurement.

4. The method of claim 1, wherein the at least one energy level measurement further comprises a peak energy level measurement.

5. The method of claim 1, wherein processing the transmitted radar signal and the received radar signal comprises:
mixing the transmitted radar signal and the received radar signal to obtain a mixed signal; and
performing a spectral analysis of the mixed signal.

6. The method of claim 5, wherein performing the spectral analysis comprises:
performing a range fast Fourier transform of the mixed signal to obtain a range spectrum,
wherein the at least one energy level measurement is obtained from the range spectrum.

7. The method of claim 1, further comprising:
determining a set of transmission parameters for transmitting a radar signal based at least in part on performing the listen before talk procedure.

8. The method of claim 7, further comprising:
transmitting the radar signal based at least in part on the set of transmission parameters.

9. The method of claim 7, wherein the set of transmission parameters is different from an initial set of transmission parameters for the transmitted radar signal.

10. The method of claim 9, further comprising:
performing an initial listen before talk procedure; and
determining the initial set of transmission parameters for the transmitted radar signal based at least in part on the initial listen before talk procedure.

11. A radar device for wireless communication, comprising:
a memory; and
one or more processors coupled to the memory, the one or more processors configured to:
process a transmitted radar signal and a received radar signal to obtain at least one energy level measurement;
determine that the at least one energy level measurement satisfies a threshold value associated with a previous measurement of a previously transmitted radar signal, wherein the at least one energy level measurement comprises a total energy level measurement; and
perform a listen before talk procedure based at least in part on determining that the at least one energy level measurement satisfies the threshold value.

12. The radar device of claim 11, wherein the transmitted radar signal and the received radar signal are frequency modulated continuous wave (FMCW) radar signals.

13. The radar device of claim 12, wherein a single cycle of the FMCW radar signals is processed to obtain the at least one energy level measurement.

14. The radar device of claim 11, wherein the at least one energy level measurement further comprises a peak energy level measurement.

15. The radar device of claim 11, wherein the one or more processors, when processing the transmitted radar signal and the received radar signal, are configured to:
mix the transmitted radar signal and the received radar signal to obtain a mixed signal; and
perform a spectral analysis of the mixed signal.

16. The radar device of claim 15, wherein the one or more processors, when performing the spectral analysis, are configured to:
perform a range fast Fourier transform of the mixed signal to obtain a range spectrum,
wherein the at least one energy level measurement is obtained from the range spectrum.

17. The radar device of claim 11, wherein the one or more processors are further configured to:
determine a set of transmission parameters for transmitting a radar signal based at least in part on performing the listen before talk procedure.

18. The radar device of claim 17, wherein the one or more processors are further configured to:
transmit the radar signal based at least in part on the set of transmission parameters.

19. The radar device of claim 17, wherein the set of transmission parameters is different from an initial set of transmission parameters for the transmitted radar signal.

20. The radar device of claim 19, wherein the one or more processors are further configured to:
perform an initial listen before talk procedure; and
determine the initial set of transmission parameters for the transmitted radar signal based at least in part on the initial listen before talk procedure.

21. A non-transitory computer-readable medium storing a set of instructions for wireless communication, the set of instructions comprising:
one or more instructions that, when executed by one or more processors of a radar device, cause the radar device to:
process a transmitted radar signal and a received radar signal to obtain at least one energy level measurement;
determine that the at least one energy level measurement satisfies a threshold value associated with a previous measurement of a previously transmitted radar signal, wherein the at least one energy level measurement comprises a total energy level measurement; and
perform a listen before talk procedure based at least in part on determining that the at least one energy level measurement satisfies the threshold value.

22. The non-transitory computer-readable medium of claim 21, wherein the transmitted radar signal and the received radar signal are frequency modulated continuous wave (FMCW) radar signals.

23. The non-transitory computer-readable medium of claim 22, wherein a single cycle of the FMCW radar signals is processed to obtain the at least one energy level measurement.

24. The non-transitory computer-readable medium of claim 21, wherein the one or more instructions, that cause the radar device to process the transmitted radar signal and the received radar signal, cause the radar device to:
mix the transmitted radar signal and the received radar signal to obtain a mixed signal; and
perform a spectral analysis of the mixed signal.

25. The non-transitory computer-readable medium of claim 21, wherein the one or more instructions further cause the radar device to:
determine a set of transmission parameters for transmitting a radar signal based at least in part on performing the listen before talk procedure.

26. An apparatus for wireless communication, comprising:
means for processing a transmitted radar signal and a received radar signal to obtain at least one energy level measurement, wherein the received radar signal is received from another radar device;

means for determining that the at least one energy level measurement satisfies a threshold value associated with a previous measurement of a previously transmitted radar signal, wherein the at least one energy level measurement comprises a total energy level measurement; and means for performing a listen before talk procedure based at least in part on determining that the at least one energy level measurement satisfies the threshold value.

27. The apparatus of claim 26, wherein the transmitted radar signal and the received radar signal are frequency modulated continuous wave (FMCW) radar signals.

28. The apparatus of claim 27, wherein a single cycle of the FMCW radar signals is processed to obtain the at least one energy level measurement.

29. The apparatus of claim 26, wherein the means for processing the transmitted radar signal and the received radar signal comprises:

means for mixing the transmitted radar signal and the received radar signal to obtain a mixed signal; and means for performing a spectral analysis of the mixed signal.

30. The apparatus of claim 26, further comprising:

means for determining a set of transmission parameters for transmitting a radar signal based at least in part on performing the listen before talk procedure.

* * * * *